United States Patent [19]
Horton et al.

[11] Patent Number: 6,024,398
[45] Date of Patent: Feb. 15, 2000

[54] SLIDING SEAT ASSEMBLY FOR AN AUTOMOBILE

[76] Inventors: Fred Horton, 3400 8Th Ave. North; Bruce Horton, 1420 1St Ave. South, both of Great Falls, Mont. 59401

[21] Appl. No.: 09/036,411

[22] Filed: Mar. 5, 1998

[51] Int. Cl.[7] ....................................................... B60N 1/04
[52] U.S. Cl. .................................. 296/65.07; 296/65.11; 297/344.23; 297/344.24
[58] Field of Search ............................. 296/65.06, 65.07, 296/65.11, 65.12; 297/344.21, 344.23, 344.24

[56] References Cited

U.S. PATENT DOCUMENTS

| | | | |
|---|---|---|---|
| 4,600,239 | 7/1986 | Gerstein et al. | 297/344.23 |
| 4,834,452 | 5/1989 | Goodrich | 297/344.24 X |
| 5,524,952 | 6/1996 | Czech et al. | 296/65.12 |

FOREIGN PATENT DOCUMENTS

| | | | |
|---|---|---|---|
| 2446198 | 8/1980 | France | 297/344.21 |
| 3540486 | 5/1987 | Germany | 297/344.21 |

*Primary Examiner*—Dennis H. Pedder

[57] ABSTRACT

A new sliding seat assembly for an automobile for aiding a motorist with entering and exiting an automobile. The inventive device includes a pair of extension brackets secured to a floor of an automobile inwardly of a door thereof. The pair of extension brackets each are comprised of a pair of telescopic portions. The telescopic portions include an inner member and an outer member. The outer members have a cross bar extending therebetween. The cross bar has a vertical support extending upwardly therefrom. A car seat is provided including a seat portion and a back portion. A circular gear is secured to a lower surface of the seat portion of the car seat. The circular gear rotatably couples with an upper end of the vertical support of the extension members. A motor is secured to one of the outer members adjacent to the circular gear. The motor has a drive gear in communication therewith on an upper end thereof. The drive gear mates with the circular gear to facilitate rotation of the car seat.

1 Claim, 2 Drawing Sheets

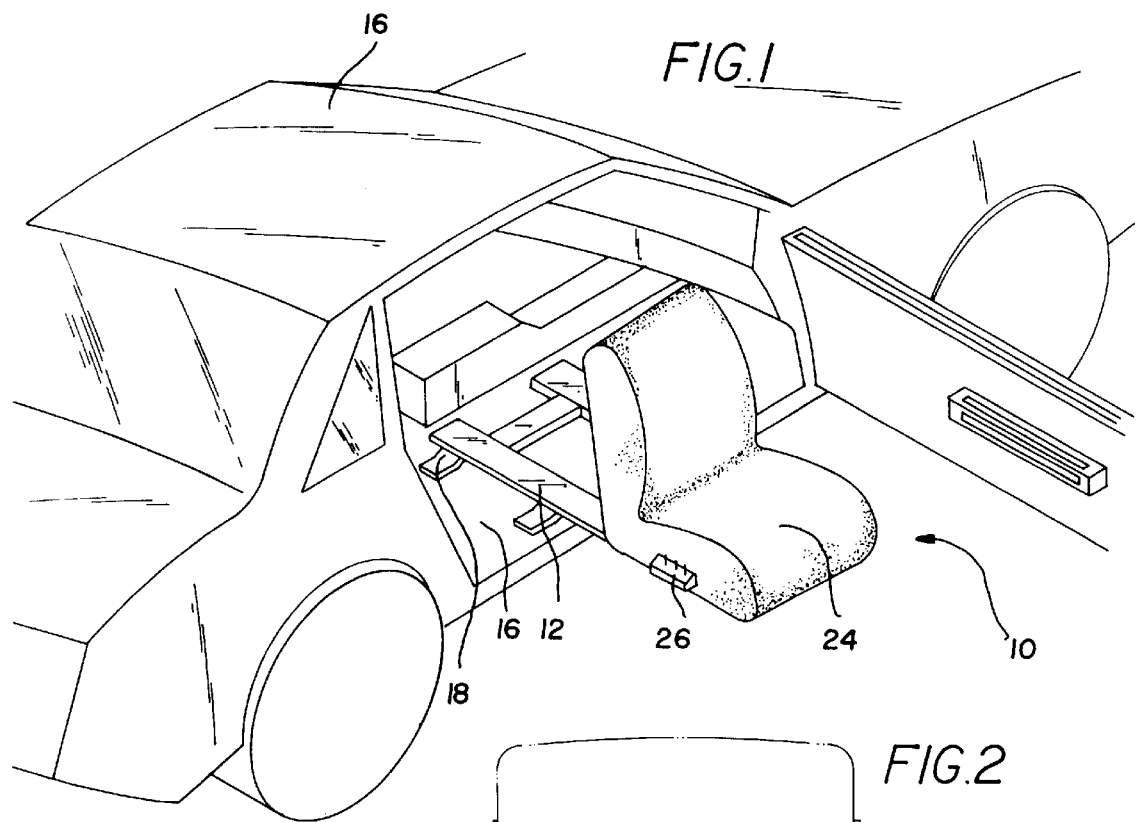
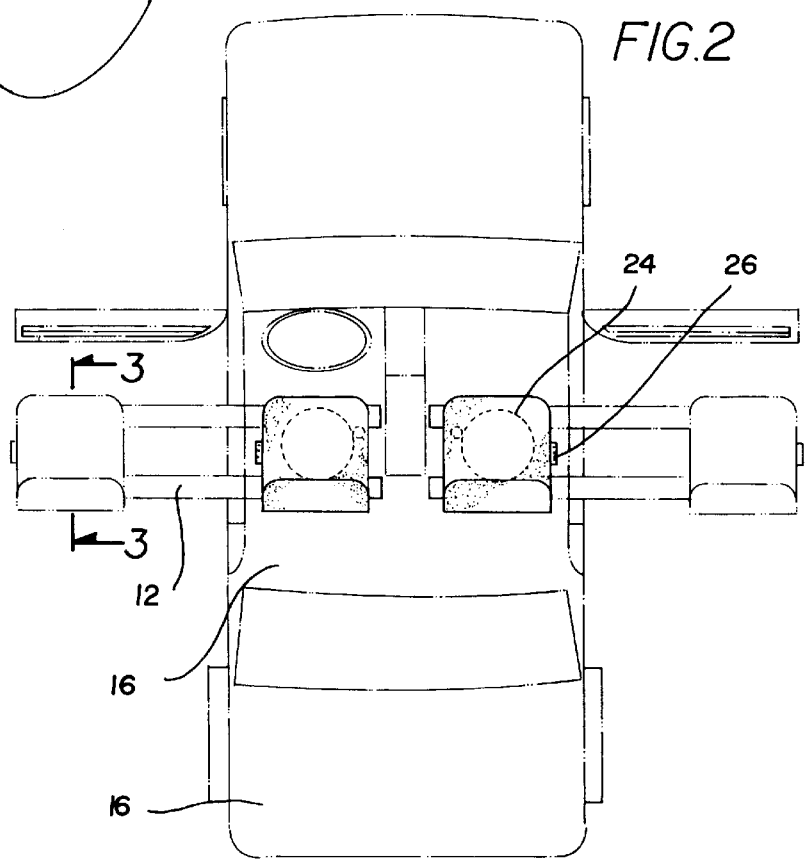

SLIDING SEAT ASSEMBLY FOR AN AUTOMOBILE

BACKGROUND OF THE INVENTION

1. Field of the Invention

The present invention relates to vehicle seats and more particularly pertains to a new sliding seat assembly for an automobile for aiding a motorist with entering and exiting an automobile.

2. Description of the Prior Art

The use of vehicle seats is known in the prior art. More specifically, vehicle seats heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle seats include U.S. Pat. No. 4,278,387 to Seguela et al.; U.S. Pat. No. 5,308,214 to Crain et al.; U.S. Pat. No. 4,170,368 to Southward et al.; U.S. Pat. No. 5,147,104 to Zalewski; U.S. Pat. No. 5,096,361 to Crawford; and U.S. Pat. No. Des. 326,568 to Lanius et al.

While these devices fulfill their respective, particular objectives and requirements, the aforementioned patents do not disclose a new sliding seat assembly for an automobile. The inventive device includes a pair of extension brackets secured to a floor of an automobile inwardly of a door thereof. The pair of extension brackets each are comprised of a pair of telescopic portions. The telescopic portions include an inner member and an outer member. The outer members have a cross bar extending therebetween. The cross bar has a vertical support extending upwardly therefrom. A car seat is provided including a seat portion and a back portion. A circular gear is secured to a lower surface of the seat portion of the car seat. The circular gear rotatably couples with an upper end of the vertical support of the extension members. A motor is secured to one of the outer members adjacent to the circular gear. The motor has a drive gear in communication therewith on an upper end thereof. The drive gear mates with the circular gear to facilitate rotation of the car seat.

In these respects, the sliding seat assembly for an automobile according to the present invention substantially departs from the conventional concepts and designs of the prior art, and in so doing provides an apparatus primarily developed for the purpose of aiding a motorist with entering and exiting an automobile.

SUMMARY OF THE INVENTION

In view of the foregoing disadvantages inherent in the known types of vehicle seats now present in the prior art, the present invention provides a new sliding seat assembly for an automobile construction wherein the same can he utilized for aiding a motorist with entering and exiting an automobile.

The general purpose of the present invention, which will be described subsequently in greater detail, is to provide a new sliding seat assembly for an automobile apparatus and method which has many of the advantages of the vehicle seats mentioned heretofore and many novel features that result in a new sliding seat assembly for an automobile which is not anticipated, rendered obvious, suggested, or even implied by any of the prior art vehicle seats, either alone or in any combination thereof.

To attain this, the present invention generally comprises a pair of extension brackets secured to a floor of an automobile inwardly of a door thereof. The pair of extension brackets have mounting brackets disposed thereon for securement to the automobile. The pair of extension brackets each are comprised of a pair of telescopic portions. The telescopic portions include an inner member and an outer member. The inner member is fixedly secured within the automobile. The outer members have a cross bar extending therebetween. The cross bar has a vertical support extending upwardly therefrom. A car seat is provided including a seat portion and a back portion. The car seat include a control panel disposed on a side portion of the seat portion. A circular gear is secured to a lower surface of the seat portion of the car seat. The circular gear rotatably couples with an upper end of the vertical support of the extension members. A bushing is positioned between the circular gear and the upper end of the vertical support to facilitate rotation of the circular gear with respect to the vertical support. A motor is secured to one of the outer members adjacent to the circular gear. The motor has a drive gear in communication therewith on an upper end thereof. The drive gear mates with the circular gear to facilitate rotation of the car seat. The motor is in communication with the control panel of the car seat.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein arc for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new sliding seat assembly for an automobile apparatus and method which has many of the advantages of the vehicle seats mentioned heretofore and many novel features that result in a new sliding seat assembly for an automobile which is not anticipated, rendered obvious, suggested, or even implied by any of the prior art vehicle seats, either alone or in any combination thereof.

It is another object of the present invention to provide a new sliding seat assembly for an automobile which may be easily and efficiently manufactured and marketed.

It is a further object of the present invention to provide a new sliding seat assembly for an automobile which is of a durable and reliable construction.

An even further object of the present invention is to provide a new sliding seat assembly for an automobile which is susceptible of a low cost of manufacture with regard to both materials and labor, and which accordingly is then susceptible of low prices of sale to the consuming public, thereby making such sliding seat assembly for an automobile economically available to the buying public.

Still yet another object of the present invention is to provide a new sliding seat assembly for an automobile which provides in the apparatuses and methods of the prior art some of the advantages thereof, while simultaneously overcoming some of the disadvantages normally associated therewith.

Still another object of the present invention is to provide a new sliding seat assembly for an automobile for aiding a motorist with entering and exiting an automobile.

Yet another object of the present invention is to provide a new sliding seat assembly for an automobile which includes a pair of extension brackets secured to a floor of an automobile inwardly of a door thereof. The pair of extension brackets each are comprised of a pair of telescopic portions. The telescopic portions include an inner member and an outer member. The outer members have a cross bar extending therebetween. The cross bar has a vertical support extending upwardly therefrom. A car seat is provided including a seat portion and a back portion. A circular gear is secured to a lower surface of the seat portion of the car seat. The circular gear rotatably couples with an upper end of the vertical support of the extension members. A motor is secured to one of the outer members adjacent to the circular gear. The motor has a drive gear in communication therewith on an upper end thereof. The drive gear mates with the circular gear to facilitate rotation of the car seat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new sliding seat assembly for an automobile according to the present invention illustrated in use.

FIG. 2 is a plan view of the present invention illustrated in use.

DESCRIPTION OF THE PREFERRED EMBODIMENT

Figure 3:
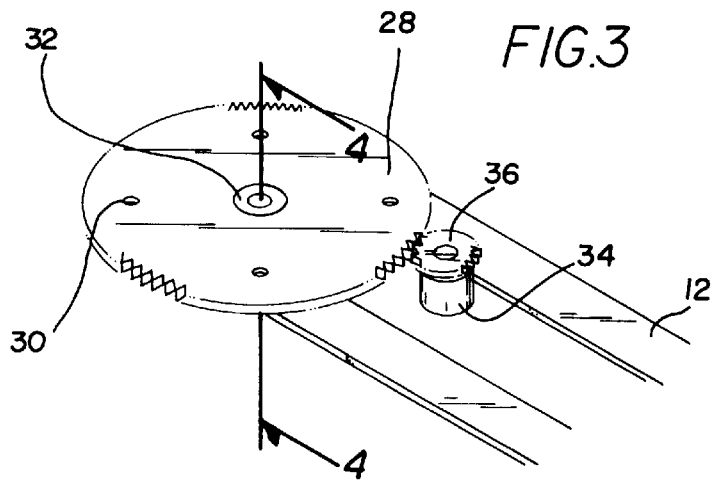
FIG. 3 is a cross-sectional view of the present invention as taken along line 3—3 of FIG. 2.
Figure 4:
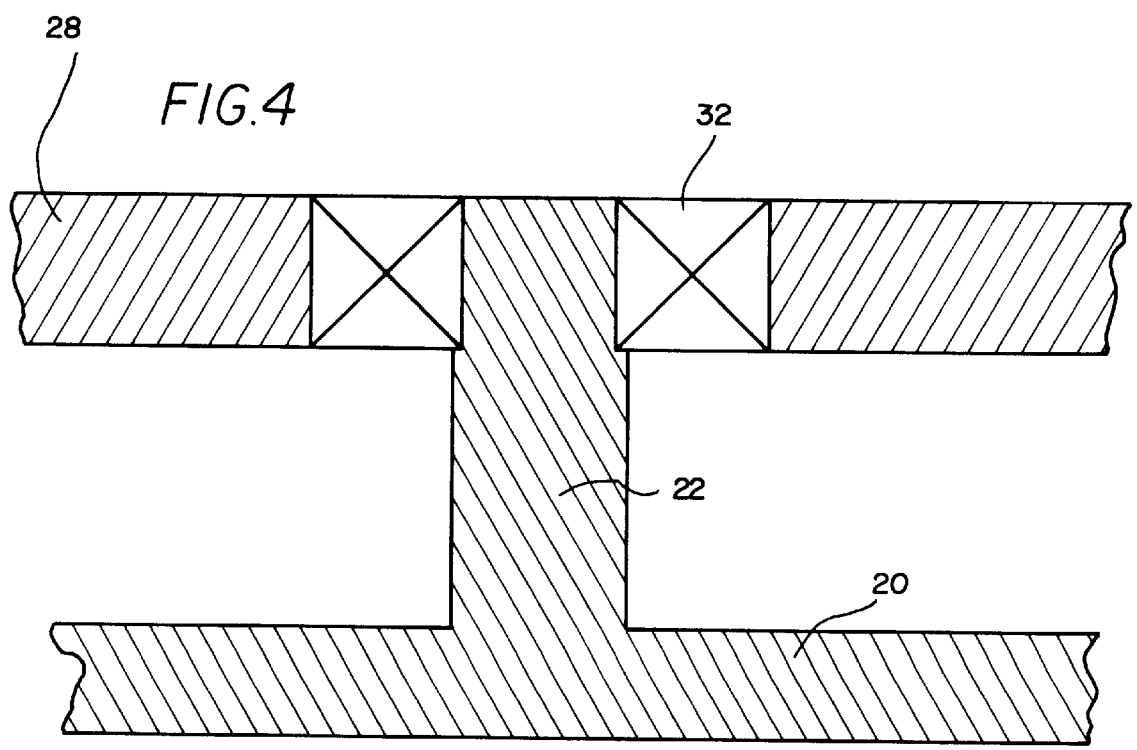
FIG. 4 is a cross-sectional view of the present invention as taken along line 4—4 of FIG. 3.

With reference now to the drawings, and in particular to FIGS. 1 through 4 thereof, a new sliding seat assembly for an automobile embodying the principles and concepts of the present invention and generally designated by the reference numeral 10 will be described.

As best illustrated in FIGS. 1 through 4, the sliding seat assembly for an automobile 10 comprises a pair of extension brackets 12 secured to a floor 14 of an automobile 16 inwardly of a door thereof. The extension brackets 12 could be installed at the front driver's position, the front passenger's position, or both. The pair of extension brackets 12 have mounting brackets 18 disposed thereon for securement to the automobile 16. The pair of extension brackets 12 each are comprised of a pair of telescopic portions. The telescopic portions include an inner member and an outer member. The inner member is fixedly secured within the automobile 16. The outer members have a cross bar 20 extending therebetween. The cross bar 20 has a vertical support 22 extending upwardly therefrom.

A car seat 24 is provided including a seat portion and a back portion. The car seat 24 includes a control panel 26 disposed on a side portion of the seat portion.

A circular gear 28 is secured to a lower surface 25 of the seat portion of the car seat 24. The circular gear 28 is provided with apertures 30 therethrough for allow the passage of mounting hardware to secured the circular gear 28 to the car seat 24. The circular gear 28 rotatably couples with an upper end of the vertical support 22 of the extension members 12. A bushing 32 is positioned between the circular gear 28 and the upper end of the vertical support 22 to facilitate rotation of the circular gear 28 with respect to the vertical support 22.

A motor 34 is secured to one of the outer members adjacent to the circular gear 28. The motor 34 has a drive gear 36 in communication therewith on an upper end thereof. The drive gear 36 mates with the circular gear 28 to facilitate rotation of the car seat 24. The motor 34 is in communication with the control panel 26 of the car seat 24.

In use, when the vehicle is parked, the driver would open the door and extend the extension arms 12. This would slide the driver or passenger out of the doorway, adjacent to the car. Note FIG. 2. The car seat 24 could then be swiveled ninety degrees so the person faces away from the side of the car. This would enable the driver or passenger to exit the car interior in the most efficient manner. Once free of the car, the car seat 24 could be easily collapsed back into the passenger compartment and the door shut. Upon returning to the parked car, the car seat 24 could be pulled out so the driver or passenger could slide into the vehicle interior. The driver or passenger could utilize the control panel 26 to control all of the rotations of the car seat 24.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A sliding seat assembly for an automobile for aiding a motorist with entering and exiting an automobile comprising in combination:

a pair of extension brackets for securing to a floor of an automobile inwardly of a door of the automobile, the pair of extension brackets having mounting brackets disposed thereon for securement to the automobile such that the extension brackets are positioned in spaced parallel relationship with respect to each other the pair of extension brackets each being comprised of a pair of telescopic portions the telescopic portions including an inner member and an outer member for extending outside the interior space of the automobile the inner member being for being fixedly secured within the automobile by said mounting brackets, the outer members having a cross bar extending therebetween for holding said outer members in parallel spaced relationship to each other, the cross bar having a vertical support extending vertically upwardly from a medial portion of the cross bar;

a car seat for positioning within the automobile, the car seat including a seat portion and a back portion, the car seat including a control panel disposed on a side portion of the seat portion;

a circular gear secured to a lower surface of the seat portion of the car seat, the circular gear rotatably coupling with an upper end of the vertical support of the outer members such that the lower surface of the seat portion is positioned immediately above the gear for minimizing a vertical distance between said outer members and said lower surface of said seat portion whereby said sliding seat assemble is adapted for supporting a person at a minimal vertical height relative to tile floor of the automobile, said car seat being positioned such that a forward edge of said car seat extends outwardly over a forward one of said outer members relative to tile automobile when said car seat is positioned in a forward facing orientation, said car seat being positioned such that a rearward edge of said car seat extends outwardly over a rearward one of said outer members relative to the automobile when said car seat is positioned in said forward facing orientation;

a bushing positioned between the circular gear and the upper end of the vertical support to facilitate rotation of the circular gear with respect to the vertical support; and a motor secured to one of the outer members adjacent to the circular gear, the motor being positioned such that at least a portion of the motor is positioned within a horizontal plane extending between the outer members, a drive gear connected to an upper end of the motor, the drive gear mating with the circular gear to facilitate rotation of the car seat, the motor being electrically connected to the control panel of the car seat.

* * * * *